United States Patent [19]

Bernard et al.

[11] Patent Number: 4,956,875

[45] Date of Patent: Sep. 11, 1990

[54] EMERGENCY RADIO ALERTING AND MESSAGE TRANSMITTING SYSTEM DIRECTABLE TO SELECTED CLASSES AND NUMBERS OF RECEIVERS

[75] Inventors: William B. Bernard, Longboat Key; William B. Minteer, Bradenton, both of Fla.

[73] Assignee: Com-Ser Laboratories, Inc., Sarasota, Fla.

[21] Appl. No.: 215,011

[22] Filed: Jul. 5, 1988

[51] Int. Cl.[5] .......................... H04B 7/14; H04B 7/24

[52] U.S. Cl. .......................... 455/13; 455/53; 455/228; 455/38

[58] Field of Search .................. 455/13, 11, 227, 228, 455/53, 54, 49, 12, 31, 32, 38; 340/825.44, 825.47, 825.48

[56] References Cited

U.S. PATENT DOCUMENTS

| | | | |
|---|---|---|---|
| 4,392,248 | 7/1983 | Eckels et al. | 455/228 X |
| 4,449,248 | 5/1984 | Leslie et al. | 455/38 |
| 4,476,488 | 10/1984 | Merrell | 455/228 X |
| 4,633,515 | 12/1986 | Uber et al. | 455/228 |

*Primary Examiner*—Douglas W. Olms
*Assistant Examiner*—Ralph Smith
*Attorney, Agent, or Firm*—Frederick Shapoe

[57] ABSTRACT

An emergency radio alerting and warning system comprising an FM transmitter having first and second encoding means, the first encoding means enabling the selection of all receivers in a given location, and the second encoder to enable broadcasting to be made to particular receivers in the selected location. The transmitter broadcasting signals with the encoded signals being followed by signals to cause audible alarms being sounded at the receivers so encoded, and then causing the messages being over loudspeakers at the selected receivers. The FM receivers being receptive but inactive until an encoded signal specific to that receiver being received, and then fully activating the receiver to sound an audible alarm to alert persons in the vicinity, and then to have the message broadcast. Timing means are present to terminate any message to the receiver after a given period unless extended by repetition of the coded signal by the transmitter.

4 Claims, 5 Drawing Sheets

200

EMERGENCY RADIO ALERTING AND MESSAGE TRANSMITTING SYSTEM DIRECTABLE TO SELECTED CLASSES AND NUMBERS OF RECEIVERS

BACKGROUND

In any community emergency situations may occur that will affect some portion of the persons living there. These emergency situations may range from relatively minor and localized occurrences, such as small fires, oil spills and traffic accidents that tie up major highways, to major catastrophes such as hurricanes, refinery and chemical plant fires and train wrecks. In many cases, utility power lines may be rendered inoperative, so that commercial radio and television receiving sets will not be usable. In some instances telephone systems are damaged and persons cannot be reached to be warned or called for duty as firemen and police officers, and nurses.

It would be desirable to have available in a community an emergency alerting and warning radio communications system that is always operable to receivers in residences, offices, shops, vehicles, hotels and any place where persons may be present, so that all or any selected group or class of individuals can be alerted and warned of a dangerous emergency situation that is occurring or is imminent, and to convey a message with instructions appropriate or helpful to the persons. Thus an entire town can be told to evacuate their homes because of an approaching hurricane in an alerting and warning message sent to everyone at one time. By telephone this would be difficult and time consuming, or impossible if high winds had broken the utility power and telephone lines. The emergency radio system would enable all the police officers to be contacted at one time and told where to report. Similarly in a single radio broadcast, all the nurses in the community would be contacted and given instructions to go to the scene of disaster.

In such emergency alerting and message transmitting system, the main transmitter would be located in the community police or other durable headquarter structures with a reliable source of power such as batteries or an engine-generator set, so that it would be operable at all times. The receivers would also be provided with an alternate source of electrical power such as a battery so that it would be ready at all times to receive emergency broadcasts from the transmitter. Encoding means at the transmitter would be operable to selectively activate only those receivers it is desired to give specific messages to.

SUMMARY OF THE INVENTION

The emergency radio alerting and warning and message transmitting system of this invention comprises an FM transmitter having a first and second main encoding means. The first main encoding means enables the transmiter operator to select a broadcast: for example - one, to residences; two, to vehicles and three, to private or individual receivers. The second main encoder comprises a plurality of encoder switches settable by the operator to specific receivers which each have a discrete code number. In this way, an alert warning can be sent to any selected receiver in the system. The first and second main encoding means are in an electrical circuit with a timer and with a FM transmitter proper which last generates a modulated FM band that is connected to a broadcast antenna. Also disposed in the circuit to the FM transmitter is a microphone over which messages and instructions can be given to be broadcast to the selected receivers. It is contemplated that the broadcast from the FM transmitter would be a first encoded signal to activate selected receivers, then an alarm actuating signal, for instance a one kHz signal, to actuate an audible alarm at the activated receiver, and finally the message or instructions. The message may state the nature of the emergency and then issue instructions appropriate to the person or persons at the location of the receiver. If it is desired, the transmitter may repeat the alarm signal followed by the message. Thereafter, another group or class of receivers will be encoded at the FM transmitter, and an FM signal will be transmitted to such another group of receivers, and these will be alerted by an initial audible alarm which is followed by a message over the loudspeaker giving instructions siuitable for this second group of persons. Thus a successive series of alerting alarms and messages, each specific to the group or class of persons at the receivers, will be rapidly transmitted.

It is contemplated that some of the FM transmitters of this invention will be of low power so that warning and alarm radio signals may be broadcast over a relatively small local area to receivers in that area. The radio signals will be broadcast over a designated FM band outside of any commercial radio band so that a clear channel is available at all times for emergency usage within that community. Normally, only one main high power transmitter, located at the local police or sheriff's office, for example, will be employed. However, the transmitters of lower power may be used in ambulances, police cars and the like, to contact nearby receivers to warn the hearers of close-by perils such as impassable roads, fallen bridges, fire and smoke hazards, and wreckage or accidents.

The FM transmitters and receivers of this invention are of simple and relatively inexpensive construction. They operate over a single fixed FM band and need no tuners. The FM receivers are preferably provided with a reliable portable source of electrical power such as a battery so as not to be dependent on utility line power which may not function in storms and other emergencies. The FM receiver is connected to the local utility lines and a battery is also connected with an automatic circuit to cut over when the utility line power fails. The FM receivers can be carried into a vehicle when the person is leaving his home or office at the approach of a hurricane, and going to a protected shelter. When in a car, the FM receiver can be switched to an auto or car decoding functioning phase so that messages being sent to cars can be received. Thus police cars, fire engines and ambulances can communicate through the receivers to warn of impassable road conditions, and the like.

Each adjacent local area will have a separate radio warning system whereby to cover all of a city or a county. If necessary, to prevent interference between closely adjacent FM transmitters, the FM bands used may be separated from each other. The local area assigned to each transmitter should be as compact as the nature of the topography permits and the distribution of the population permits. Thus a small island community of a width of a mile or two and a length of 10 miles may find one FM transmitter fully adequate. A small town or village of a thousand or so homes and businesses clustered in an area of a circle of from 3 to 6 miles in radius would be served by a single FM Transmitter.

DETAILED DESCRIPTION OF THE INVENTION

Figure 1:
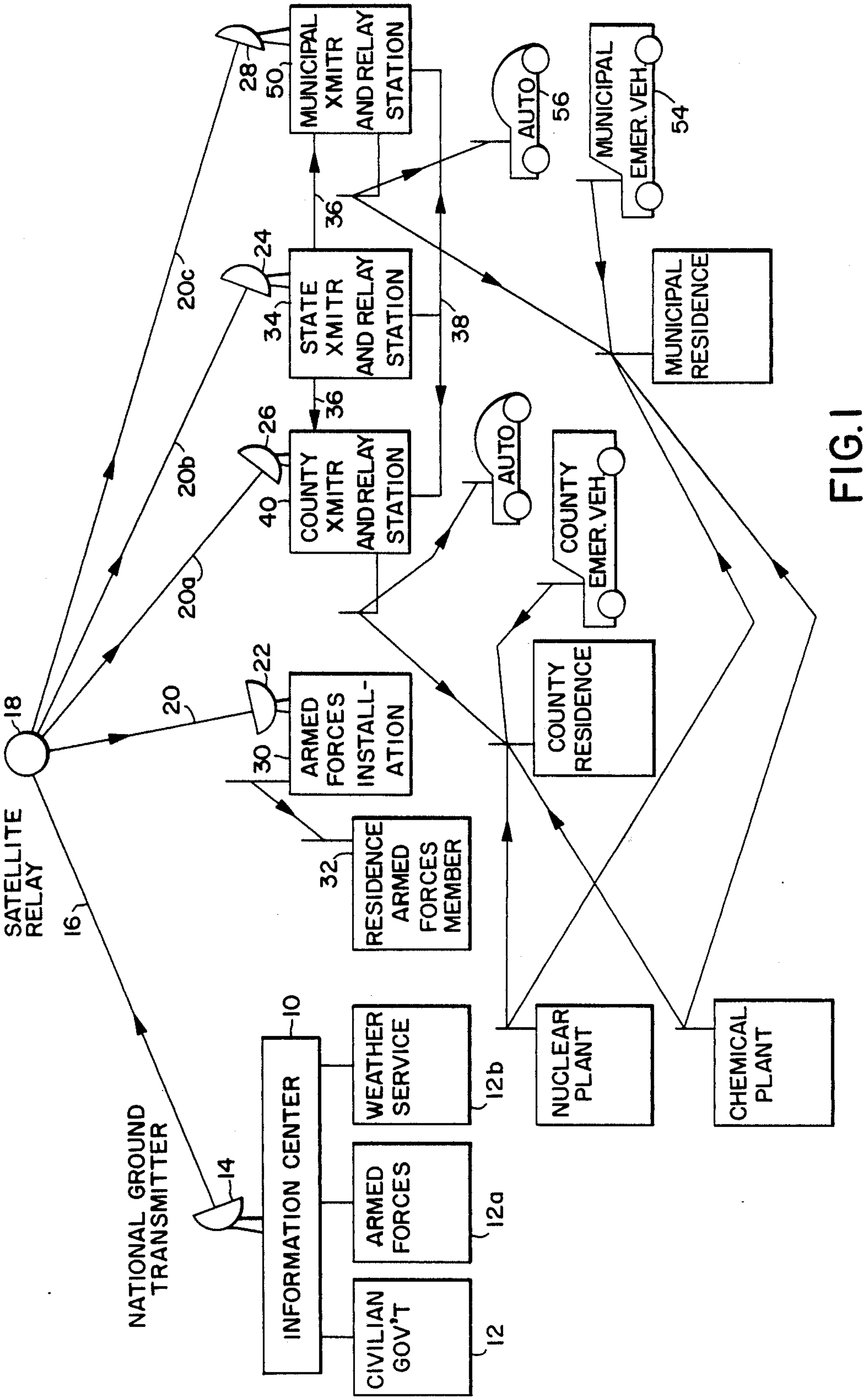
FIG. 1 is a schematic view.

Referring to FIG. 1 of the drawing, there is illustrated in schematic form a proposed type of a nationwide alerting and warning emergency radio system that uses on a local level the FM radio transmitter and FM receiver system of this invention. Both local and widespread emergency situations can be handled rapidly and efficiently by the FM radio system by communicating to any selected group of persons in each locality in order to alert and warn them about the emergency and instructing each selected group as to what action to take.

On a national scale, emergency situation information would be communicated by radio, telephone or other means to one, or to several, strategically located national emergency information centers 10. To the center 10 information about actual or incipient dangerous situations would be supplied by such sources as the weather bureaus and their stations, police departments, fire departments, military and other governmental officials, designated as 12. At the information center 10, the situation information so received would be collated, appraised, organized and reviewed by a trained staff, and releases and advisory notices be prepared to be disseminated to the areas in the country that would be affected by the emergency. As shown, the information center 10 is tied to a ground radio transmitter 14 which directs a radio team 16 carrying an emergency message to a satellite relay 18 in a geosynchronous orbit over the nation. From the satellite relay 18 radio signals 20, **20*a*, 20*b*, and 20*c* are directed to radio receiver dishes at ground stations. Thus radio signals 20 may be received in a dish 22 at an armed forces installation 30 where an FM transmitter beams a local signal to residences 32 of armed force members. Officers and troops can be mobilized for duty in case of floods, hurricanes and major disasters. Signals 20*b* are received by a dish antenna 24 which supplies the emergency information to a state information and relay station 34, which in turn processes the emergency information and relays it by radio via 36 to county transmission and relay stations 40, and via 36 municipal transmission and relay stations 50. The state relay station 34 can also use wire line signal means 38 to inform affected county stations 40 and municipal stations 50 about problems in the local communities. County relay stations 40 can receive emergency information by radio signals 20*a* by means of their receiver dish 26 and they can radio appropriate instructions and messages to the local residences and vehicles. The local municipal stations 50 also have dishes 28 which may receive broadcasts 20*c* directly from the national satellite relay 18**. The FM transmitter in the community station is the critical factor in seeing that each affected residence is notified promptly about any dangerous situation, and the persons are given messages with instructions for dealing with the emergency.

Local emergencies are dealt with on a local community basis and usually do not reach the national information center 10. Local police, fire and hospital or ambulance personnel will radio, telephone or otherwise inform the local station 50 about local emergencies such as fires, wrecks and floods. Decisions are made at the FM transmitter station about who to alert and so on.

Factories and plants in which potentially dangerous occurrences can take place, as, for example, nuclear power plants, refineries, chemical manufacturing and processing factories where toxic, combustible or explosive products are handled, may have both radio and telephony contact with the local FM transmitter station, as well as with a national emergency information center. Thus prompt warning may be given to the local neighborhood when a critical or dangerous situation has been reached therein. This system permits warnings to be given to the local community so as to enable prioritized evacuations.

Figure 2:
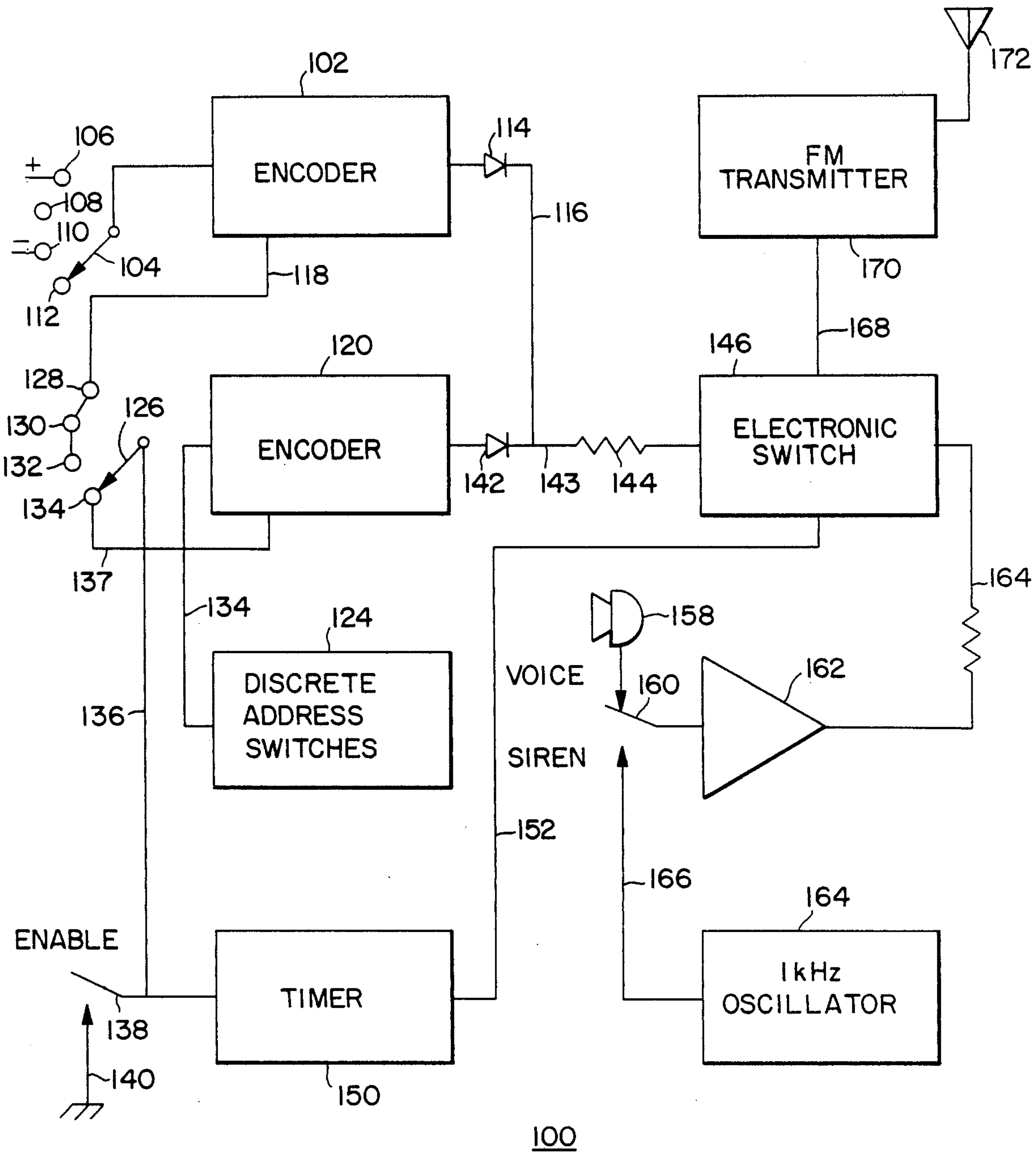
FIG. 2 is a block circuit diagram of a FM transmitter.

Referring to FIG. 2 of the drawings, there is shown a block electrical diagram for an FM transmitter for practicing the invention. The FM transmitter 100 comprises a first main encoder 102 in circuit with a switch 104 having four position contacts 106, 108, 110 and 112 which enables the transmitter to be directed to send radio messages to specific types or classes of FM receivers. Thus the contact setting 106 will be for radio messages to a home, setting 108 would be for messages to auto or vehicle, and setting 110 would be for private or individual messages. The encoded signals from the first encoder 102 pass through an isolation diode 14 to line 116. A second main encoder 120 is connected to an assembly of discrete address switches 124 whereby to enable any one of a large number of discrete or separate receivers to be reached by the FM transmitter. A multiposition switch 126 has several contact settings 128, 130 and 132 connectable with the first main encoder by line 118, and a contact 134 which receives electrical power via line 137 to the second main encoder, such power being in circuit with conductor 136 which is connected to an enabling switch 138 connectable to a ground source 140. Switches 104 and 126 are part of a 2 pole-4 position rotary switch and move together so that when switch 104 engages contacts 106, 108 and 110, the switch 126 engages contacts 128, 130 and 132, but only the first encoder 102 functions. When switch 104 engages contact 112, the first encoder does not function, but switch 126 engages contact 134 and thereby the second encoder 120 functions so that signals from the discrete address switches 124 reach the second via 129. The encoder output from the first main encoder 102 passes via line 116 to line 143, and from the second main encoder passes through the isolation diode 142 and to line 143 with resistor 144 thence the encoder outputs go to an electronic switch 146 controlling the passage of signals to the FM transmitter 170 proper. A timer 150 supplies electrical power by line 152 to the electronic switch 146 for predetermined periods of the order of from 20 to 45 seconds which is long enough to alert any person in the vicinity of the receiver and to impart the message about the emergency. However, if a longer message is being broadcast, then the timer 150 will automatically reset and thus one or more additional periods of time may be allocated to any broadcast.

To enable messages to be broadcast to the FM receivers, there is provided a microphone 158 connectable by a two position manual switch 160 to an electronic amplifier 162 from which the voice current is carried by line 163 to the electronic switch 146. In initiating a broadcast to a selected receiver, to activate the receiver's functioning, the two position switch 160 would ordinarily be operated by the speaker first to a position to contact line 166 (designated "SIREN") which carries a 1 kHz signal from a 1 kHz oscillator 164 which is carried through amplifier 162 to the electronic switch 146, and then to the the FM transmitter 170 via line 168 and finally a modulated FM band is radiated from the transmitter's antenna 172. Thus any FM receiver tuned to the FM band and fully activated, will initially receive the 1 kHz signal which will put an audible alarm at the receiver into operation to alert anyone in the vicinity thereof. The person at the microphone will keep the switch 160 in contact with the 1 kHz oscillator for several seconds so as to be certain that persons in the vicinity of the FM receiver will be alerted and ready to hear the verbal message. Then the switch 160 will return to contact the microphone and the person will talk into the microphone and give the emergency message. At the termination of the message the timer 150 will function to end the broadcast to a selected encoded address, and the FM transmitter operator can encode a succeeding address at either 104 or 126, and start another broadcast to another receiver or group of FM receivers.

Figure 3:
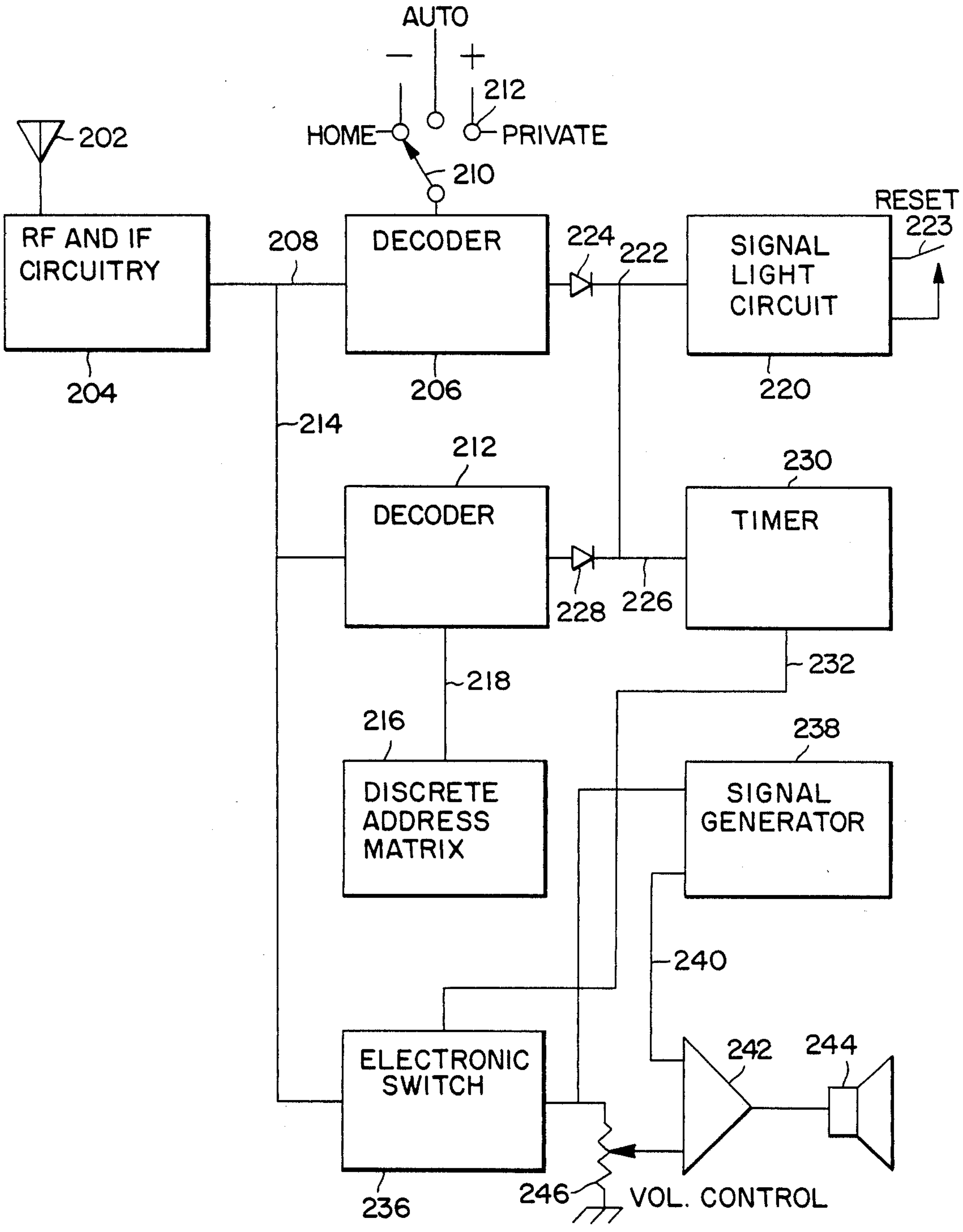
FIG. 3 is a block circuit diagram of an FM receiver.

Referring to FIG. 3 of the drawing, there is illustrated a block diagram of an FM receiver 200 adapted to cofunction with the FM transmitter illustrated in FIG. 1. Radio signals from the FM transmitter 100 are received by antenna 202 and the modulated FM signals pass through an RF and IF circuitry means 204 which converts them to demodulated signals. As indicated previously, the receivers 200 are energized with electrical power at all times so as to receive emergency broadcasts at any time. The demodulated signals pass via conductors 208 and 214 into decoders 206 and 212 which control the passage of only those signals coded for that specific receiver, and if the code is acceptable, the entire demodulated signal enters the audio circuits of the receiver. Such signals pass over leads 206 to a first decoder 208 provided with a manual switch 210 having a plurality of contacts 212. It is desirable to have available three specific settings for the switch 210: a first position designated as "Home" which would be the normal position for most usage so as to receive the usual emergency alerts while at one's home; a second position designated as "Auto" when the FM receiver is placed in a vehicle during evacuation of a local area; and a third position designated as "Private" when the person at the FM receiver has phoned for help, so that an ambulance driver with a FM transmitter can contact the home to ask for assistance in locating the residence.

When the switch 210 is in the "Home" position the receiver will respond at all times to tuned signals from any fixed or mobile transmitter within range which is sending the code for "HOME". Likewise the receiver will respond to signals addressing "AUTO" if the switch 210 is switched to "AUTO" and will respond to signals addressing "PRIVATE" when switch 210 is switched to "PRIVATE". Line 214 connected to line 208 also passes the demodulated signal to additional decoders, only one of which is shown in the diagram. These decoders are set to respond discrete addresses by the matrix 216. This permits the receiver to cut off any broadcast signal not specifically coded to it, and to receive broadcasts coded for it and not intended for wide distribution such as is intended for broadcasts encoded for "HOME", "AUTO", or "PRIVATE".

If either decoder 206 or 212 receives the proper address for that receiver, a signal is sent through the diode 224 or 228 associated with the decoder to line 222 which passes the signal to the signal light circuit and the timer 230. The signal light circuit 220 turns on a light which stays lit until the circuit is reset, thus indicating that a signal has been received. The timer 230 controls the electronic switch 236 which activates the audio system. The timer 230 keeps the switch turned on for a period of about 20 to 45 seconds after which period it turns off unless a new or additional proper address signal is received.

Ordinarily immediately after the address code has been broadcast by the transmitter the operator will press the "SIREN" button at the transmitter; this will cause a 1 kHz audio signal to be broadcast. This audio signal causes the signal generator 238 to produce a siren signal which is amplified by the audio output amplifier 242 and sent to the speaker 244. The siren signal is not affected by the volume control and thus always is at a high level.

The timer 230 turns off the FM receiver after a preset time which is deemed adequate to transmit an emergency message. However, if a lengthy message has to be broadcast, the FM transmitter will automatically place in the modulated FM broadcast a signal to reactivate the timer so that it will renew the period and start the timer on an additional time period.

It is contemplated that a discrete code designation may be given to a single FM receiver or the same discrete code be applied to a class or group of related FM receivers. Thus all the FM receivers in a given apartment house or condominium may be provided with the same code designation so that all the owners or tenants can be warned at the same time that a fire had started in a nearby building, or that a hurricane was threatening to strike nearby in the near future. Likewise, all of the police officers or a designated unit or class in the community, could have the same code in their FM receivers, and thus in a single broadcast message all members of any group could be alerted and called for duty. Therefore persons outside of this selected group are not bothered or involved in such specific broadcast messages.

Figure 4:
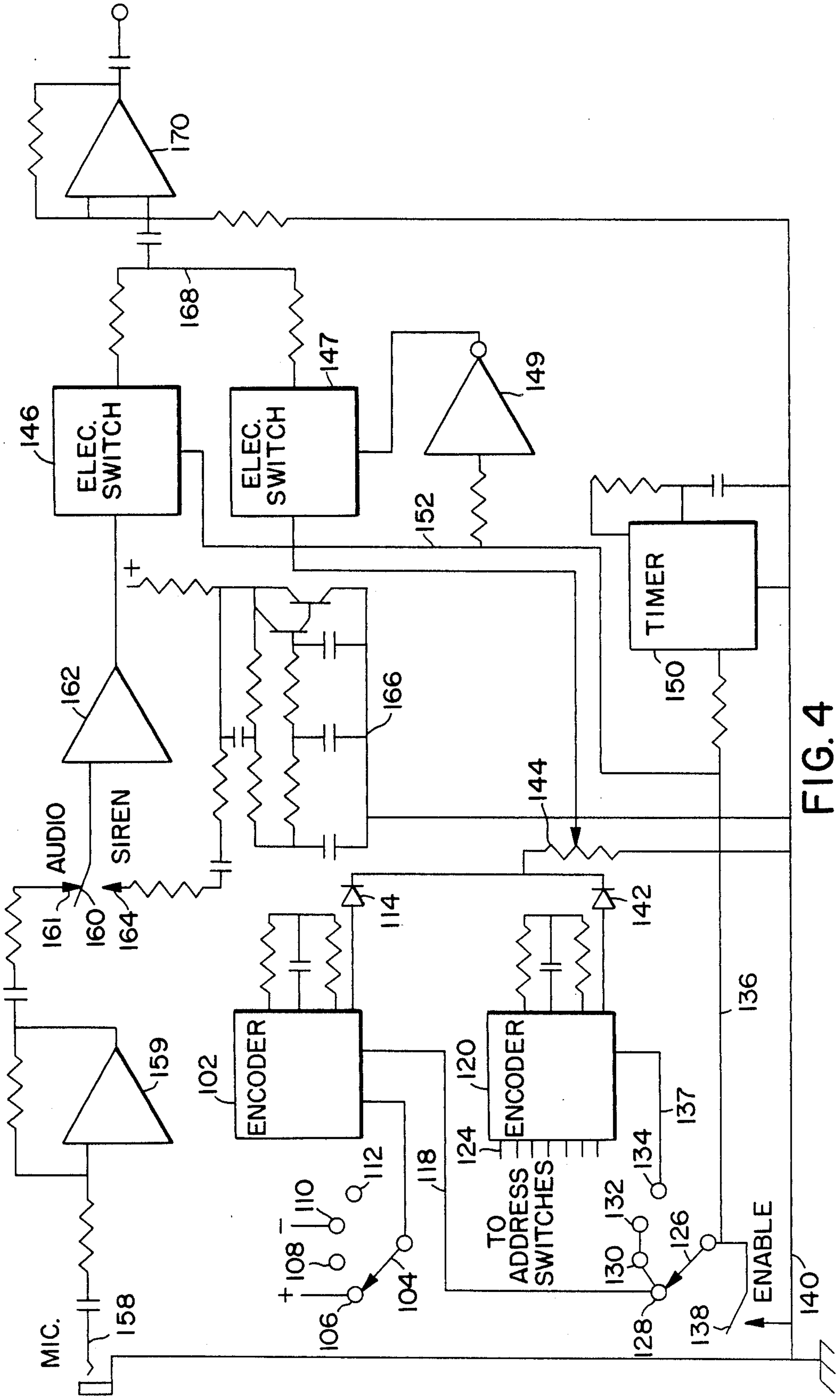
FIG. 4 is a detailed electrical circuit diagram of one form of FM transmitter.

In FIG. 4 there is illustrated in more detail a portion of the circuit block diagram 4 of the transmitter 100. There are commercially available semiconductor encoder units that may be employed for the encoders 102 and 120. An example are the CMOS units sold by Motorola under the designation MC145026 which will function quite well in the transmitter. Each of the MC145026 units has nine inputs and when encoded with trinary data (0,1, and open) will allow 19683 discrete codes to be addressed. The microphone 158 has an output which passes to a semiconductor amplifier 159, and the amplified signal passes by lead 161 to the switch 160 from which it can go the the electronic amplifier 162 and finally to the electronic switch 146. Both of the amplifiers 159 and 162 may be comprised of the commercially available 3140 semiconductor chips. The detailed internal circuit diagram for the oscillator 166 is shown in the drawing. While FIG. 2 shows the electronic switch 146 as a single block unit, it has been found that two separate semiconductor units are employed to form a SPDT switch as illustrated in FIG. 4. Thus an electrical switch 147 is open when switch 146 is closed. The output of the electronic switches is capacitatively passed to the conventional FM transmitter to modulate the FM band thereof, and then broadcast. An amplifier 149 is controlled by signals from the timer 150 as well as the enable switch 138, and signals from the amplifier pass to the electronic switch 146. Thus the timer causes the broadcasting of the coded signals at timed intervals so that the FM receivers are kept in a fully active audio reception condition as long as the FM broadcast to the specifically encoded receivers is continuing.

Figure 5:
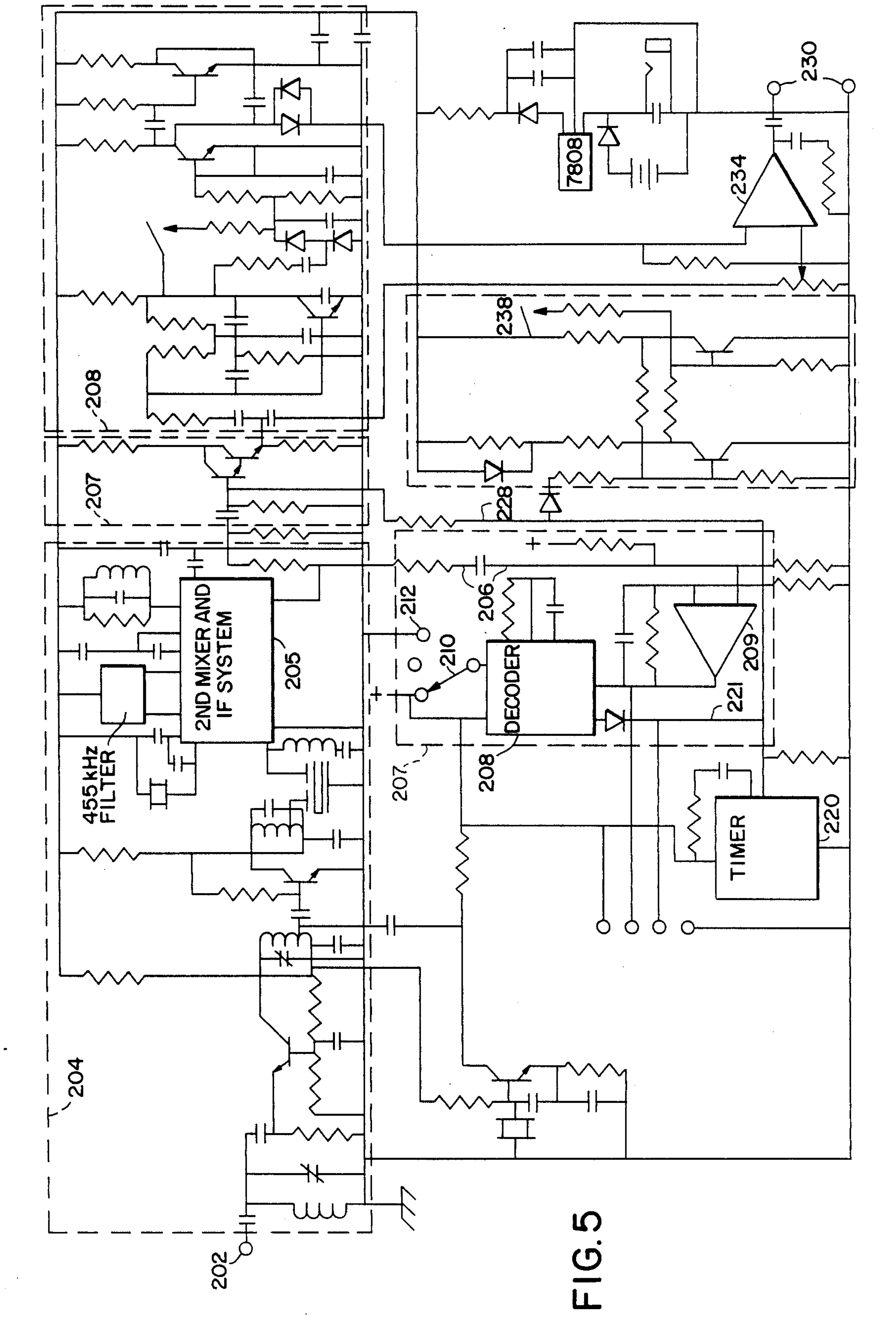
FIG. 5 is a detailed electrical circuit diagram of one form of FM receiver.

FIG. 5 of the drawing is a more detailed electrical circuit diagram of the block circuit diagram of FIG. 3. The electrical circuitry will be clear to one skilled in the art of FM receivers. However, the following additional explanation is being supplied for clarification. Basically the receiver 200 comprises a double super-heterodyne circuit which is within the dashed lines of block 204, and the circuit results in a first intermediate frequency of 10.7 MHz and in a second intermediate frequency of 455 kHz. The block 204 circuit includes a block 205 designated as "SECOND MIXER AND IF SYSTEM" and this may comprise a commercially available semiconductor chip under the designation MC3359. Block 207 in dashed lines is a control circuit which is turned on when a code signal passes from 204 over conductor 206 to decoder 208 and the decoder determines that the code is acceptable to that receiver, whereupon the decoder sends an appropriate output signal over lead 228 to the timer 220 which in turn sends a signal to the circuit in block 207 to fully activate the receiver circuits to respond to all signals from the FM transmitter. A coded signal passing along lead 206 to the decoder 208 is preferably initially amplified by a suitable microchip unit 209 before entering the decoder 208. For this there may be used a commercially available 3140 microchip unit. A suitable chip for the decoder 208 is that commercially available under the designation "MC145028". The timer 220 is ordinarily set to function for about 45 seconds, after which the receiver is turned off. To keep the FM receiver 200 fully activated for longer than 45 seconds, the FM transmitter must repeat the correct code address for that receiver at intervals of less than 45 seconds for example at 20 second intervals.

We claim:

1. In an emergency radio alerting and warning system directable to selected classes and numbers of receivers, the system comprising at least one FM radio transmitter for broadcasting modulated signals in a selected FM band and a plurality of cooperating FM radio receivers energized at all times and tuned for receiving broadcast signals in the selected FM band and each receiver having an audio circuit functioning in response to the modulated signals, the improvement comprising a plurality of encoders in the FM transmitter, at least one encoder settable to generate a first series of signal pulses which when broadcast and received by the FM receivers and demodulated will activate the audio circuit in a large selected group of the plurality of FM receivers, at least one other encoder in the transmitter for generating another series of signal pulses that when demodulated will fully activate only selected ones of a smaller number of the plurality of FM receivers, whereby alerting and warning messages may be transmitted from the FM transmitter and received only by the fully activated selected FM receivers, and means in the FM transmitter for generating alerting and warning modulating signals which upon reception by the FM receivers that are fully activated will cause warning means associated with the FM receivers to alert anyone in the vicinity that an emergency situation has arisen, and message means in the FM transmitter for broadcasting a message in the FM band only to the selected fully activated FM receivers, and means in the FM transmitter for so modulating the FM band as to broadcast in sequence a series of encoded pulses for fully activating selected FM receivers, the alerting and warning signals, and finally an audio message, and timer means in each receiver in each FM receiver operable upon receipt by a decoder of a coded signal pulse to activate audio circuit for a selected brief period and at the end of this period the timer means inactivates the audio circuit.

2. The emergency radio alerting and warning system of claim 1, wherein the FM transmitter includes timer means associated with the encoders so as to repeat the series of coded pulses at timed intervals within the short period of time of the of the timer means in the FM receivers whereby to maintain the audio circuit in the activated FM receivers in a prolonged fully activated state.

3. The emergency radio warning and alerting system of claim 1, wherein the FM receiver comprises a relatively low frequency oscillator capable of producing electrical oscillations of the order of one kHz and a microphone to be used in broadcasting messages, circuit means for connecting the output of the oscillator and the microphone into FM band output of the transmitter, and switch means for enabling the oscillator and the microphone to be connectable alternatively into the circuit means, whereby in an activated audio circuit in an FM receiver the audio circuit can be first energized by the relatively low frequency oscillation signals from the oscillator so as to produce a loud penetrating sound in the vicinity of the FM receiver and thus to alert and warn anyone nearby that an emergency message over the loudspeaker thereof would follow.

4. The emergency radio warning and alerting system of claim 1, wherein the FM receiver has visual signal means associated with the audio circuit and the output circuit of the decoding means, and means energizable by the activation of the audio circuit of the FM receiver cause the visual means to show that the FM receiver has been activated, and manually resettable means associated with the visual signal means to cause the visual signal means to cease such showing.

* * * * *

UNITED STATES PATENT AND TRADEMARK OFFICE

CERTIFICATE OF CORRECTION

PATENT NO. : 4,956,875

DATED : Sep. 11, 1990

INVENTOR(S) : William B. Bernard, William B. Minteer and Frederic E. Finch

It is certified that error appears in the above-identified patent and that said Letters Patent is hereby corrected as shown below:

On the title page, item [75], the inventors should read as follows:

--William B. Bernard, Longboat Key; William B. Minteer; and Frederic E. Finch, both of Bradenton, all of Fla.--.

Signed and Sealed this

Third Day of March, 1992

*Attest:*

HARRY F. MANBECK, JR.

*Attesting Officer*

*Commissioner of Patents and Trademarks*